Patented Aug. 10, 1948

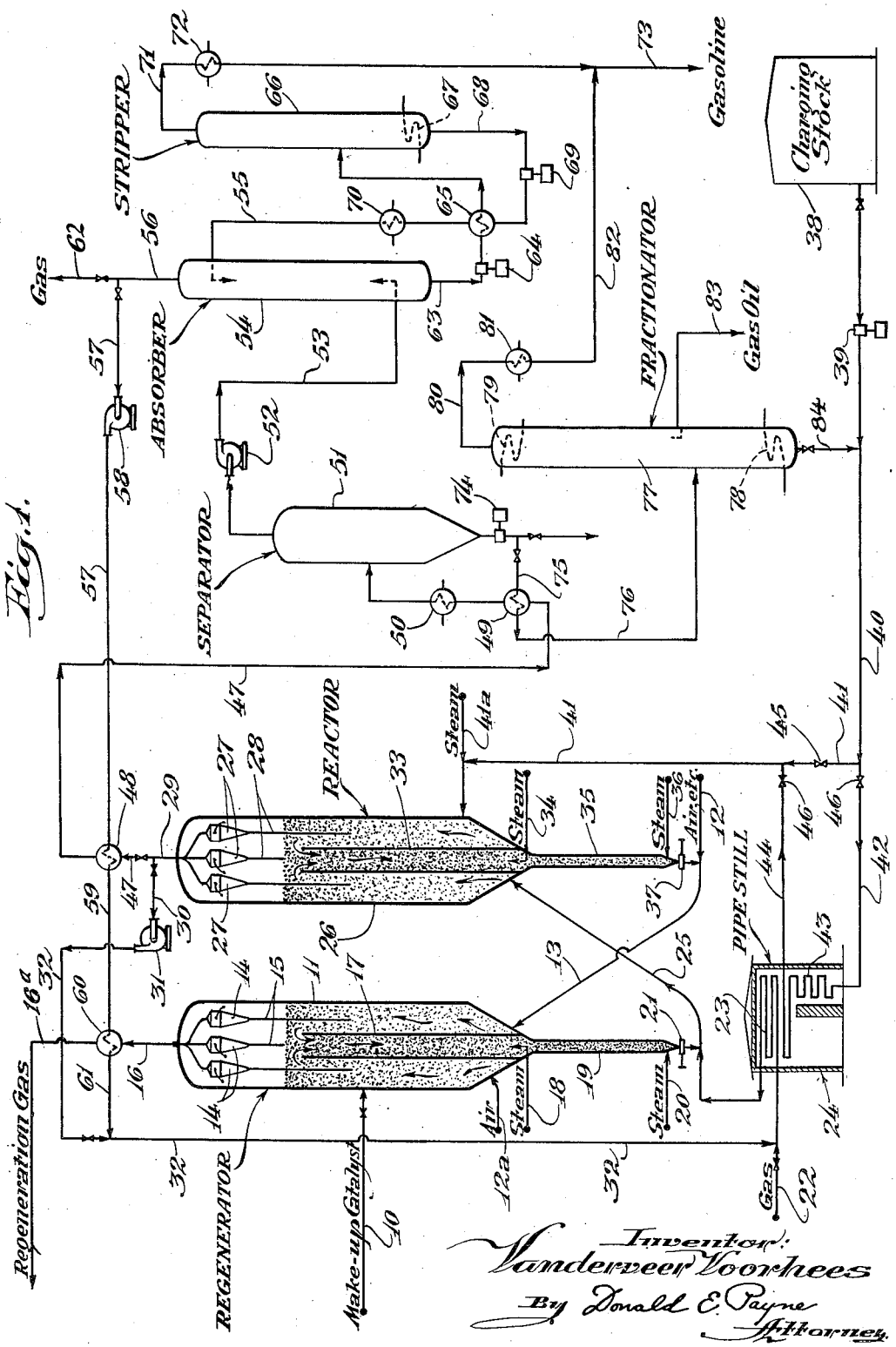

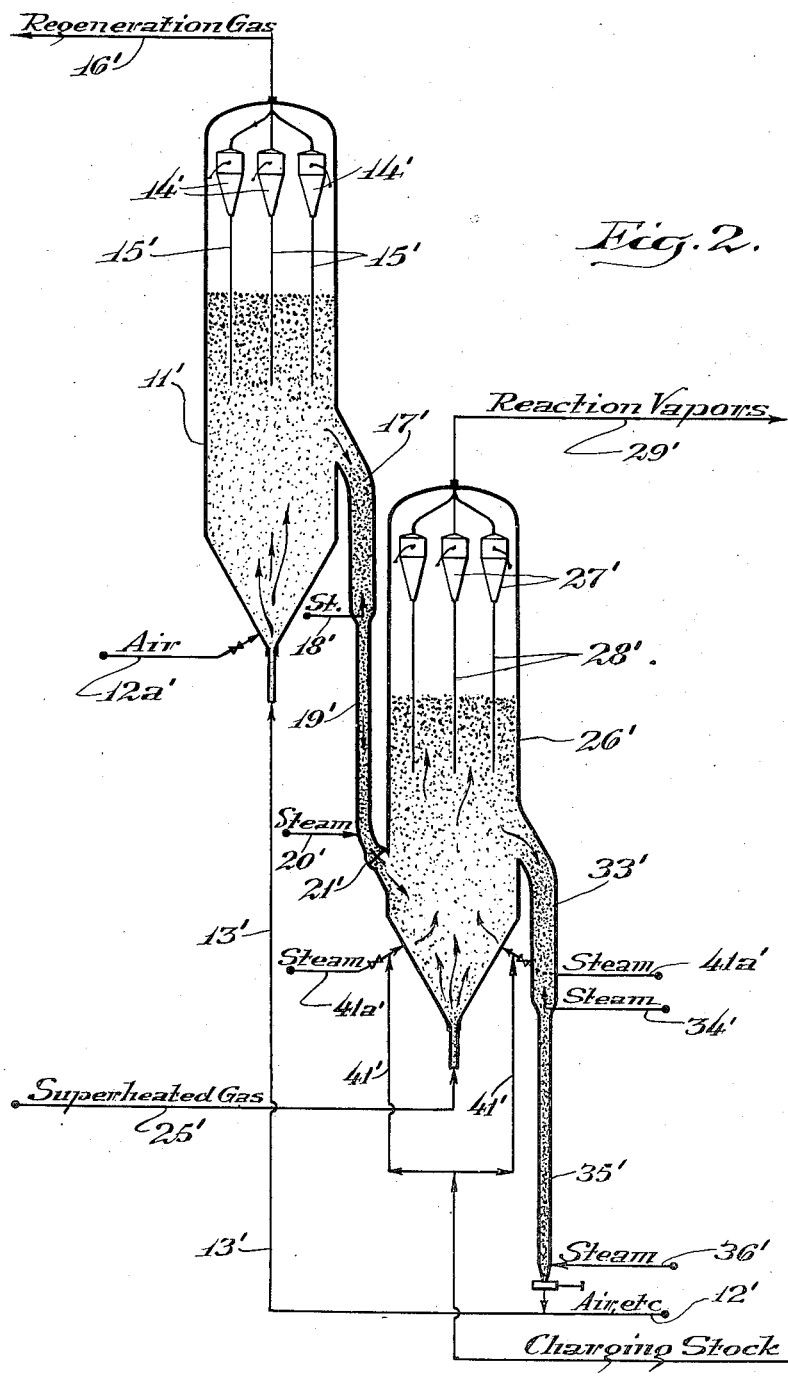

2,446,678

UNITED STATES PATENT OFFICE 2,446,678

POWDERED CATALYST CONVERSION SYSTEM

Vanderveer Voorhees, Homewood, Ill., assignor to Standard Oil Company, Chicago, Ill., a corporation of Indiana Application August 30, 1941, Serial No. 409,081

4 Claims. (Cl. 196—52)

This invention relates to improvements in methods and means for operating a powdered catalyst conversion system such, for example, as a system for catalytically cracking gas oils, heavy oils, or reduced crudes. An object of my invention is to provide a method and means for avoiding thermal cracking of a charging stock which is to undergo catalytic conversion at high temperature. In other words, my object is to provide a method and means whereby the conversion must necessarily occur in the presence of the catalyst and wherein substantially no conversion or transformation can take place in preheater coils, transfer lines, etc.

A further object of the invention is to decrease the amount of carbonaceous material or coke which is formed in the catalytic conversion process, thereby increasing catalyst life, and to increase the quantity and quality of high octane number motor fuel obtainable from any given charging stock.

A further object is to provide a catalytic conversion system which is extremely flexible with regard to charging stock, i. e., which may operate with equal facility on gas oils, heavier oils and even reduced crudes. A further object is to avoid coke deposition and erosion problems in pipe still or preheater coils. A still further object is to provide an improved method and means for supplying the heat of conversion in a powdered catalyst system and for effectively utilizing by-product gases and heat in a conversion system for actually promoting the conversion and increasing product yields. Other objects will be apparent as the detailed description of the invention proceeds.

An outstanding feature of the invention is the use of a highly superheated gas for simultaneously maintaining powdered catalyst in a dense turbulent suspended catalyst phase, supplying heat of vaporization and heat of conversion, and reducing the effective pressure of the catalytic conversion step. The use of a superheated gas for supplying heat of conversion and insuring a true vapor phase reaction is, of course, well known in the art but heretofore the use of such superheated gas has always given rise to serious problems, particularly because of the difficulty in distributing the heat from the superheated gas throughout a conversion zone resulting in inevitable local overheating. In the present invention local overheating of the charging stock is avoided by directly introducing said charging stock either in the vapor phase or the liquid phase or partially vapor and partially liquid phase into a dense turbulent suspended powdered catalyst conversion zone, preferably at a low point in said zone. In such a system the suspended catalyst particles themselves act as heat carriers or absorbers and in their turbulent movement throughout the conversion zone they bring about an equalization of temperature so that every part of the conversion chamber is at substantially the same temperature as every other part thereof. I maintain the desired turbulent dense phase catalyst suspension by introducing at the base of the conversion chamber a gas which has been preheated to about 1000 to 2000° F., usually about 1200 to 1500° F. This hot gas thus supplies a substantial amount of the heat required for conversion and this heat is distributed substantially instantaneously throughout the entire conversion zone by the turbulent movement of suspended catalyst in the conversion zone which turbulent movement, in turn, is effected and maintained by the introduction of the superheated gases at the base of the conversion zone.

In catalytic conversion processes such as catalytic cracking, catalytic reforming, catalytic isomerization, etc., pressure has been found to have a marked effect on carbon deposition. In one series of tests it was found that 1.7% of carbon or carbonaceous material (based on feed) was deposited on the catalyst at atmospheric pressure, 2.9% at 10 pounds' gauge pressure and 3.7% at 30 pounds' gauge pressure for equivalent gasoline yields in all cases. In another series of tests, 1.9% by weight (based on feed) of carbonaceous material was deposited on catalyst at 30 pounds' gauge pressure as compared with 0.6% at atmospheric pressure for equivalent gasoline yields in both cases. By employing a superheated gas I may operate my system at atmospheric or even at superatmospheric pressure but at the same time have an effective pressure, i. e., partial pressure of charging stock vapors, which is below atmospheric pressure. In other words, the use of large quantities of superheated gas gives the same advantage that would be obtained by effecting the conversion under a vacuum and this advantage is particularly important in the case of heavy charging stocks such as residuums because it minimizes carbonaceous deposits on the catalyst and thus prolongs catalyst life and simplifies the problem of catalyst regeneration. In addition to the pressure effect, the gas acts to absorb the products of the reaction from the catalyst surface, thus avoiding over-conversion and carbonization.

In previous systems employing superheated gas as a heat carrier, this superheated gas has been directly admixed with charging stock liquid or vapors en route to a conversion zone or the superheated gases have necessarily impinged against catalyst particles in a fixed bed so that there was always local overheating at the point at which the superheated gas was introduced. In my system the charging stock is not contacted with the superheated gas while it is above conversion temperature and the charging stock is not subjected to high preheating temperatures. Thermal conversion in my system is thus entirely avoided. In my system the charging stock is introduced directly into a conversion zone in which there are no locally overheated spots and in which the temperature is substantially uniform throughout the entire zone. All of the conversion is effected in direct proximity with catalyst particles which are maintained in rapid motion in a dense turbulent suspended catalyst phase with the result that higher knock-rating motor fuels are produced.

Heretofore conversion systems required the use of special charging stock preheaters which were necessarily designed for particular types of charging stocks to be used, i. e., a preheater designed for light gas oil could not be used for a reduced crude because the reduced crude would cause coking in the tubes. A furnace design for reduced crude would likewise be unsatisfactory for gas oil. In my system it is unnecessary to obtain complete vaporization of the charging stock in preheater coils and, in fact, preheating coils may be entirely dispensed with. An important feature of my system is the fact that it is omnivorous with regard to charging stocks.

The higher knock-rating of gasolines produced in my system may be due in part at least to the greater rate of desorption of products from the catalyst in the presence of the large volume of gas in the conversion zone. Since the partial pressure of the products in this zone is relatively low I not only obtain a decrease in coke formation but I likewise obtain a product of higher knock-rating.

Another feature of the invention is the heat economy resulting from cycle gas to pick up heat from reaction products and regenerator gases and to supply this heat to the conversion zone. If the cycle gases contain appreciable amounts of propane and other condensible hydrocarbons they may be partially cracked or dehydrogenated by their high temperature contact with the catalyst before the catalyst meets the charging stock and this, in turn, may not only serve to advantageously precondition the catalyst but it may serve also to augment gasoline yields by gas reversion, i. e., an actual combination of a part of the superheated gas with the products of the conversion to give additional quantities of motor fuel. The invention will be more clearly understood by the following detailed description read in conjunction with the accompanying drawings which form a part of this specification and in which:

Figure 1 is a schematic flow diagram of my conversion system illustrating the use of internal standpipes in the reactor and regenerator, and Figure 2 is a schematic vertical plan of a reactor-regenerator arrangement for use in the system shown in Figure 1.

A specific example of my invention will be described as applied to the catalytic cracking of reduced crude by means of a silica-alumina or silica-magnesia type powdered catalyst. Such catalyst may be prepared by the acid treating of natural clays such bentonite and is exemplified by the activated clay marketed as Super Filtrol. Such catalysts may be synthetically prepared by incorporating a metal oxide, such as alumina, magnesia, thoria, zirconia, etc., with activated silica by impregnation, mixing, or hydrolytic adsorption. An excellent catalyst may be prepared by ball-milling silica hydrogel with active alumina or magnesia, the ball-milled dough being dried at a temperature of about 240° F. and then heated to a temperature of about 900 to 1100° F. The catalyst may be prepared by forming a gel from dilute sodium silicate in the presence of an aluminum salt by the addition of excess dilute sulfuric acid, the resulting gel being boiled for an hour or two with an excess of dilute ammonium hydroxide solution before washing and then being washed, dried and heated as in the previous example. The silica-alumina or silica-magnesia catalyst may be rendered more stable by the addition thereto of zirconia or thoria. Thus the ball-milled silica-magnesia catalyst may be improved by pretreating the magnesia with a thorium nitrate solution so that the finished catalyst may, for instance, have the following composition:

| | Per cent |
|---|---|
| Silica | 66 |
| Magnesia | 27 |
| Thoria | 7 |

No invention is claimed in the composition of the catalyst per se and no further description of the catalyst is, therefore, necessary.

The catalyst in this specific example is in powdered form with a particle size of about 10 to 100 microns. The invention is applicable, however, to other catalyst sizes provided only that the catalyst be of such particle size and density that it may be suspended, aerated and handled in the manner herein described.

The bulk density of the settled catalyst may be about 30 to 40 pounds or more per cubic foot. When this catalyst is subjected to slight aeration, i. e., with gas or vapor velocities of about .03 to .3 foot per second, its bulk density may be about 25 to 35 pounds per cubic foot. When the catalyst is suspended in a large conversion reactor or regenerator by gases or vapors having a vertical velocity of about .4 to 4 feet per second, or more specifically about 1½ to 2½ feet per second, the catalyst is maintained in a dense turbulent suspended catalyst phase the bulk density of which is about 10 to 25 pounds per cubic foot, a gas or vapor velocity giving a density of about 15 to 18 pounds per cubic foot usually being preferred. In the light or dispersed catalyst phase, the bulk density of the catalyst may be as high at 1 to 4 pounds per cubic foot but is usually much lower than 1 pound per cubic foot.

Catalyst may be introduced into the system through line 10 to the regenerator chamber 11 which is preferably a large cylindrical vessel provided with a cone-shaped bottom. Air or other oxygen-containing regeneration gas from line 12 may be introduced through line 13 into the base of this regenerator at such a rate as to produce the dense turbulent suspended catalyst phase therein. Alternatively this air may be introduced through line 12a. The regeneration gases are withdrawn from the upper dilute catalyst phase in the regenerator through cyclone separators 14 which remove catalyst particles from the gases and return these catalyst particles to the dense turbulent suspended catalyst phase through dip legs 15. The air or regeneration gases are then removed from the regenerator through line 16.

When the level of the dense turbulent suspended catalyst phase rises above the top of internal standpipe 17 this dense catalyst overflows into the standpipe and any oxygen-containing gases are stripped therefrom in this standpipe by means of steam introduced through line 18. The lower part 19 of this standpipe may be of smaller cross-sectional area since the amount of steam introduced through line 20 for aeration purposes is less than the amount introduced through line 18 for both stripping and aeration. Catalyst is withdrawn from the base of this standpipe in amounts regulated by valve or feeder mechanism 21.

Gas may be introduced to the system from any source through line 22. This gas is preferably a so-called refinery dry gas, i. e., a gas containing hydrogen, methane, ethane, propane, ethylene, propylene, etc. and it may be of various compositions. I may employ hot flue gases, producer gases or the like instead of hydrocarbon gases as a heat carrier, particularly if such gases are free from oxygen or from constituents which might cause oxidation under reaction conditions. A producer gas might be obtained, for instance, by passing a mixture of air and steam through a bed of incandescent coke under such conditions that the resulting gas will be free from oxygen and oxidizing tendencies. In fact, I may employ hot regeneration gases directly from a catalyst regeneration step provided that such regeneration gases are free from oxygen or oxidizing components; oxygen-free regeneration gases may be obtained, for example, by using a stage regeneration system as described in my United States Patent No. 2,273,076. As above stated, however, I prefer to employ a hydrocarbon gas of the type which is produced in the conversion process itself.

This gas is passed through tubes or heater coils 23 in pipe still 24 and superheated to a temperature of about 1000 to 2000° F., preferably about 1200 to 1500° F. The hot gases pick up catalyst discharged from the base of standpipe 19 and carry this catalyst through transfer line 25 to the base of reactor 26. This reactor is of the same type and it may be of substantially the same size as the regenerator 11 and it is of such cross-sectional area that the vertical vapor velocities therein will maintain the desired dense turbulent suspended catalyst phase. Gases or vapors leave the top of this reactor from the upper light dispersed catalyst phase through cyclone separator 27 which knocks back catalyst particles through dip legs 28 to the dense turbulent suspended catalyst phase in the reactor. The gases and vapors then leave the reactor through line 29 and in the starting up procedure they may be recycled in line 30 by blower 31 through line 32 to heating coils 23.

When the level of the dense turbulent suspended catalyst phase reaches the top of standpipe 33 the catalyst overflows therein and is stripped from gases or vapors by means of steam introduced through line 34. The stripped catalyst then passes through the lower end 35 of this standpipe wherein it is maintained in aerated condition by steam introduced through line 36. Catalyst is discharged from the base of standpipe 35 in amounts regulated by valve 37 and is picked up by gas introduced through line 12 and returned in gas suspension through line 13 to the regenerator.

When the system has thus been filled with catalyst and brought to such temperature that the dense suspended turbulent catalyst phase in reactor 26 is about 850 to 1050° F., the supply of make-up catalyst may be discontinued except for the small amount of make-up catalyst which is thereafter added to maintain catalyst inventory and to supply catalyst losses. At this time the charging stock from storage tank 38 is pumped by pump 39 through lines 40 and 41 for direct injection into the reactor, preferably at a plurality of points at the base thereof. Instead of introducing this charging stock directly from the storage tank into the reactor it may be passed through line 42 and coils 43 of furnace 24 (or any other suitable furnace or heat exchanger) and then passed through lines 44 and 41 to the reactor, valve 45 being closed and valves 46 being open. In the case of gas oil or other relatively clean stocks, the charging stock may be completely vaporized in coils 43 but they should not be heated to any temperature which will effect thermal conversion. In the case of reduced crude, the temperature of the preheated stock should not exceed 700 to 850° F. but higher temperatures may, of course, be used as long as thermal conversion is avoided. Reduced crudes may contain salts or other impurities which might deactivate the catalyst, in such case the charging stock should of course be "de-salted" or otherwise treated for removing deleterious substance before it is charged to my system.

The charging stock may thus be introduced into the reactor in the vapor phase or in the liquid phase or in partially liquid and partially vapor phase. In any event, the charging stock is substantially instantaneously heated in the reactor itself to the conversion temperature which is preferably about 900 to 950° F. but which may range from about 850 to 1050° F. The contained heat in the dense suspended turbulent catalyst in the reactor causes the instantaneous vaporization of any unvaporized portion of the feed and the turbulence of the catalyst flow in this zone prevents any local cooling and insures substantially uniform temperatures throughout the zone.

The introduction of charging stock vapors or the vaporization of charging stock in situ in the reactor will, of course, tend to increase the vertical vapor velocity in the reactor and this vertical vapor velocity should be below about 4 or 5 feet per second. It may, therefore, be necessary or desirable to reduce the amount of superheated gas introduced through line 25 when the charging stock is introduced through line 41. Steam may be employed to assist in the injection of the charging stock and steam or other gases may be introduced through line 41a during the starting up period and then diminished or cut off when the charging stock is introduced into the system. The time of vapor contact in the reactor should be about 4 to 40 seconds or more, preferably 10 to 15 seconds.

When the charging stock is introduced, the valve in line 30 is closed and the reaction gases and vapors are withdrawn through line 47, heat exchanger 48, heat exchanger 49, and cooler 50 to separator 51. The heat exchangers and the cooler will reduce the temperature of the gases and vapors to permit the condensation of all of the gas oil components and a substantial amount of the gasoline components. The uncondensed gases are taken overhead and forced by blower 52 through line 53 to absorber 54 into the top of which a cool absorber oil is introduced through line 55. Unabsorbed gases, such as hydrogen, methane, ethane, propane, ethylene, propylene, etc. are taken overhead through line 56, line 57, blower 58, heat exchanger 48, line 59, heat exchanger 60 and line 61 to line 32 which returns these gases to coils 23 of heater 24. Any gases not required for recycling are withdrawn from the system through line 62. After leaving heat exchanger 60 the recycle gases may, if desired, be passed through a coil (not shown) in the regenerator 11 before charging to heater 24. Where the regenerator temperature is sufficiently high, enough heat may be recovered in this way to maintain the reaction in 26, in which case it will not be necessary to heat the gases in heater 24.

Rich oil is withdrawn from the bottom of the absorber through line 63 and forced by pump 64 through heat exchanger 65 to the top of stripper 66 which is provided with suitable heating means 67 at its base. Lean oil from the base of the stripper is withdrawn through line 68 and forced by pump 69 through heat exchanger 65 and cooler 70 back to the top of the absorber. Stripped gasoline components are taken overhead from the stripper through line 71, condensed in cooler 72 and withdrawn to storage through line 73.

The liquids from the base of separator 51 are forced by pump 74 through line 75, heat exchanger 49, line 76 to fractionator 77 which may be provided with suitable heating means 78 and reflux means 79. Gasoline is taken overhead through line 80, condensed in cooler 81 and withdrawn through line 82 to storage or for blending with the gasoline in line 73. Gas oil may be withdrawn as a side stream from the fractionator through line 83. Any unrecovered catalyst may be withdrawn with a heavy oil fraction from the base of the fractionator through line 84 and returned to the reactor with charging stock.

The catalyst in reactor 26 gradually becomes coated with a carbonaceous deposit and a part of this catalyst is, therefore, constantly withdrawn through standpipes 33 and 35, picked up with air or other oxygen-containing gas from line 12 and introduced into the regenerator 11 for the combustion of these carbonaceous deposits. Too much combustion in the transfer line should be avoided. The air or other gas introduced through line 12 may be only sufficient to effect catalyst transfer and the bulk of air for supporting combustion may be introduced through line 12a. The regenerator should be of sufficient cross-sectional area to provide a vertical gas velocity therein of about .4 to 4, usually about 1½ to 2½ feet per second while supplying sufficient oxygen to effect the necessary combustion and it should be of sufficient volume to provide the time necessary for burning the carbonaceous deposits from the catalyst. The gas contact time in the regenerator may be longer than in the reactor and it usually ranges from about 5 to 50 seconds or more. I prefer to operate with the regenerator at a temperature of about 1000° F. although this temperature may range from about 900 to 950° F. to as high as 1100 or 1200° F. or even higher provided that the catalyst material is not deleteriously effected by the high temperature. Certain synthetic alumina-silica catalysts can be regenerated at temperatures as high as 1400 to 1600° F. The regeneration gases leave the exchanger through line 16 and heat exchanger 60 wherein a substantial amount of their heat is given up to the recycled gases as hereinabove described. The regeneration gases which are vented through line 16a may be passed through any known power or heat recovery means and the last traces of catalyst may be removed therefrom by any suitable scrubber, electrostatic precipitator or other known means.

Regenerated catalyst is withdrawn through standpipes 17—19 and returned to the reactor with superheated gases through transfer line 25 at substantially the same rate that spent catalyst is introduced into the regenerator. About 1 to 15 parts by weight of catalyst may be cycled in this manner for each part by weight of charging stock that is introduced into the reactor. The recycled heat carrier gas provides a means for introducing larger quantities of catalyst into the reactor than could feasibly be carried into the reactor by vaporized charging stock vapors.

The amount of carrier gas recycled may be varied within wide limits depending upon the particular charging stocks employed, the activity of the particular catalyst, etc., but it should be in an amount sufficient to maintain the temperature in the reactor at about 850 to 1050° F., usually about 900 to 950° F. Thus when charging 35° A. P. I. Mid-Continent gas oil to the process vaporized at a temperature of 800° F. and when cracking at 950° F. in the reactor with a conversion of approximately 50%, I find that the amount of hot gas at 1340° F. required for raising the temperature of the oil vapors to the temperature of the reactor and for providing the necessary heat of conversion is approximately 3800 cubic feet (standard conditions) per barrel of oil charged. The corresponding volume of gas measured at reactor temperature is approximately 10,000 cubic feet.

A moderate pressure is preferably maintained throughout the system, i. e., about 15 to 150 pounds per square inch although pressures near atmospheric pressure are preferred. The pressures may be substantially uniform throughout the system but it should be understood, of course, that the pressure at the top of the reactor and regenerator will be lower than the pressure in the base thereof due to the pressure head of the dense turbulent suspended catalyst material therein and the pressure at the base of standpipes 19 and 35 will be higher than the pressure in the base of the reactor and regenerator respectively due to the head of catalyst in the standpipe. Thus with a pressure of 15 pounds per square inch at the top of the reactor and regenerator, substantially the same pressures may be employed in separator 51 and absorber 54 but the pressure at the base of the regenerator and reactor will be about 22 pounds or more per square inch and the pressure at the base of standpipes 19 and 35 may be about 27 pounds per square inch.

The system illustrated in Figure 1 may not be suitable for certain catalysts whose activity is impaired at high temperatures, particularly when the gas is superheated to temperatures above 1100 or 1200° F. I may, of course, split the recycled gas stream, pick up the regenerated catalyst in that portion of the stream which is only heated to 1000 to 1100° F., and introduce the other portion of the stream at a temperature of 1200 to 2000° F. directly into the reaction chamber. I may use steam for injecting the catalyst into the reaction chamber and introduce all of the superheated gas directly to the catalyst chamber.

A preferred arrangement of the reactor-regenerator system is illustrated in Figure 2. The regenerator 11', is at a higher level than reactor 26' or at any rate is maintained under sufficiently higher pressure so that the regenerated catalyst which leaves the regenerator through stripping section 17' and standpipe 19' may be introduced directly into the reactor in amounts regulated by valve 21'. The superheated gas enters the reactor through line 25'. The charging stock enters the reactor through line 41' with or without steam introduced through line 41a'. In this case the temperature in the reactor is maintained constant throughout the entire reactor volume by the rapid motion of the catalyst particles in the dense turbulent suspended catalyst phase so that while the gas may be introduced at a temperature of about 1500° F. regenerated catalyst may be introduced at a temperature of about 1000° F. and charging stock may be introduced at a temperature below 800° F., a uniform temperature of about 900 or 925° F. will be maintained throughout the entire reactor. Spent catalyst will be withdrawn from the reactor through stripping section 33' and returned to the regenerator as described in connection with Figure 1 and the rest of the system will likewise be substantially the same as hereinabove described. It should, of course, be understood that a wide variety of reactor and regenerator arrangements may be employed in practicing my invention. Standpipes 17 and 33 may be entirely omitted and lines 13 and 25 may discharge into regenerator 11 and reactor 26 at a point spaced from the bottom thereof so that catalyst may settle out of the dense turbulent suspended catalyst phase below the point of its introduction and may be stripped with steam in the base of the regenerator and reactor respectively immediately above standpipes 19 and 35. Various other modifications of the reactor and regenerator system will be apparent to those skilled in the art from the above description.

My invention is not limited to catalytic cracking but is also applicable to other conversion processes such as dehydrogenation, aromatization, hydroforming, isomerization, etc. For dehydrogenation or catalytic dehydroaromatization the catalyst is preferably a VIth Group metal oxide such as chromium oxide or molybdenum oxide mounted on active alumina base and the charging stock is preferably a heavy naphtha. In this case the recycled gas may consist chiefly of hydrogen and little or no gas oil will be formed so that the fractionation system will be accordingly modified.

While I have described in detail a specific example of my invention, it should be understood that the invention is not limited to any of these specific conditions or details since many modifications and alternative conditions will be apparent from the above description to those skilled in the art.

I claim:

1. The method of operating a powdered catalyst conversion system which comprises superheating a carrier gas, suspending regenerated catalyst in said superheated carrier gas, introducing said suspended catalyst by means of said carrier gas into a conversion zone, maintaining a vertical gas velocity in said conversion zone sufficiently low to keep catalyst in dense turbulent suspended condition therein, introducing a charging stock stream at a low point directly into the dense turbulent suspended catalyst in said zone, removing catalyst particles from gases leaving the upper part of said zone and returning said particles to said dense turbulent suspended catalyst phase, directly withdrawing catalyst as an aerated column from the dense turbulent suspended catalyst phase in the conversion zone, introducing catalyst from the base of said column into a regeneration zone, introducing a regeneration gas at a low point in said regeneration zone and passing said gas upwardly in said zone at a vertical velocity for maintaining dense phase turbulent catalyst suspension therein, separating catalyst particles from regeneration gases leaving the upper part of said regeneration zone and returning said separated particles to said dense phase and downwardly withdrawing catalyst directly from the dense turbulent suspended phase in the regeneration zone as an aerated column for said suspension in said superheated gas.

2. The method of claim 1 wherein the charging stock is a hydrocarbon containing constituents heavier than gas oil and wherein said hydrocarbon charging stock is at least partially in the liquid phase when it is introduced into the conversion zone.

3. The method of claim 1 wherein the charging stock is a difficultly vaporizable heavy hydrocarbon and wherein the superheated gas is at a temperature within the approximate range of 1000 to 2000° F. when the catalyst is dispersed therein.

4. The method of effecting catalytic conversion of a heavy high-boiling hydrocarbon charging stock which method comprises superheating a fluidizing gas to a temperature substantially higher than conversion temperature, introducing said superheated fluidizing gas at the base of a conversion zone, introducing regenerated catalyst of small particle size into said conversion zone, maintaining a vertical gas velocity in said conversion zone sufficiently low to keep catalyst therein in dense turbulent suspended condition, introducing a heavy high-boiling hydrocarbon charging stock stream which is at least partially in the liquid phase directly at a low point into the dense turbulent suspended catalyst in said conversion zone, removing catalyst particles from gases leaving the upper part of said zone and returning said particles to said dense turbulent suspended catalyst phase, directly withdrawing catalyst as an aerated column from the dense turbulent suspended catalyst phase in the conversion zone, introducing catalyst from the base of said column into a regeneration zone introducing a regeneration gas at a low point in said regeneration zone and passing said gas upwardly therein at a vertical velocity for maintaining dense phase turbulent catalyst suspension therein, separating catalyst particles from regeneration gases leaving the upper part of the regeneration zone and returning said separated particles to the dense phase therein, downwardly withdrawing catalyst directly from the dense turbulent suspended catalyst phase in the regeneration zone as an aerated column and returning catalyst from said column for introduction to said conversion zone.

VANDERVEER VOORHEES.

REFERENCES CITED

The following references are of record in the file of this patent:

UNITED STATES PATENTS

| Number | Name | Date |
|---|---|---|
| 1,845,058 | Pier | Feb. 16, 1932 |
| 1,984,380 | Odell | Dec. 18, 1934 |
| 2,039,904 | Hill | May 5, 1936 |
| 2,231,231 | Subkow | Feb. 11, 1941 |
| 2,247,097 | Menshih | June 24, 1941 |
| 2,249,924 | Wilson | July 22, 1941 |
| 2,251,571 | Howard | Aug. 5, 1941 |
| 2,253,486 | Belchetz | Aug. 19, 1941 |
| 2,273,089 | Carpenter | Feb. 17, 1942 |
| 2,282,855 | Egloff | May 12, 1942 |
| 2,302,209 | Geddin | Nov. 17, 1942 |
| 2,305,569 | Degnen | Dec. 15, 1942 |